United States Patent [19]

Herman

[11] 4,313,709
[45] Feb. 2, 1982

[54] DEVICE FOR REMOVING AND/OR RE-INSTALLING MANHOLE LIDS ON AN APPARATUS UNDER PRESSURE

[76] Inventor: Michel M. Herman, rue Haute-Rochette, 116, B.4120 Flemalle (Ramet), Belgium

[21] Appl. No.: 23,313

[22] Filed: Mar. 23, 1979

[30] Foreign Application Priority Data

Mar. 23, 1978 [BE] Belgium .................................. 646405

[51] Int. Cl.³ ....................... B66C 11/12; B66C 23/18
[52] U.S. Cl. .................................. 414/684.3; 105/147
[58] Field of Search ........................... 212/4, 128, 129; 105/147; 414/164, 684.3

[56] References Cited

U.S. PATENT DOCUMENTS 3,262,593  7/1966  Hainer .............................. 105/147 X
3,622,019 11/1971  Lorrek ................................. 212/4 X Primary Examiner—Robert G. Sheridan
Attorney, Agent, or Firm—Young & Thompson

[57] ABSTRACT

An integral and rapid device in which means are arranged for permitting both to support a stud tightening machine and the lids and to accurately position the tightening machine relative to each manhole and the studs. This device is particularly useful for removing and re-installing manhole lids in a nuclear apparatus.

2 Claims, 2 Drawing Figures

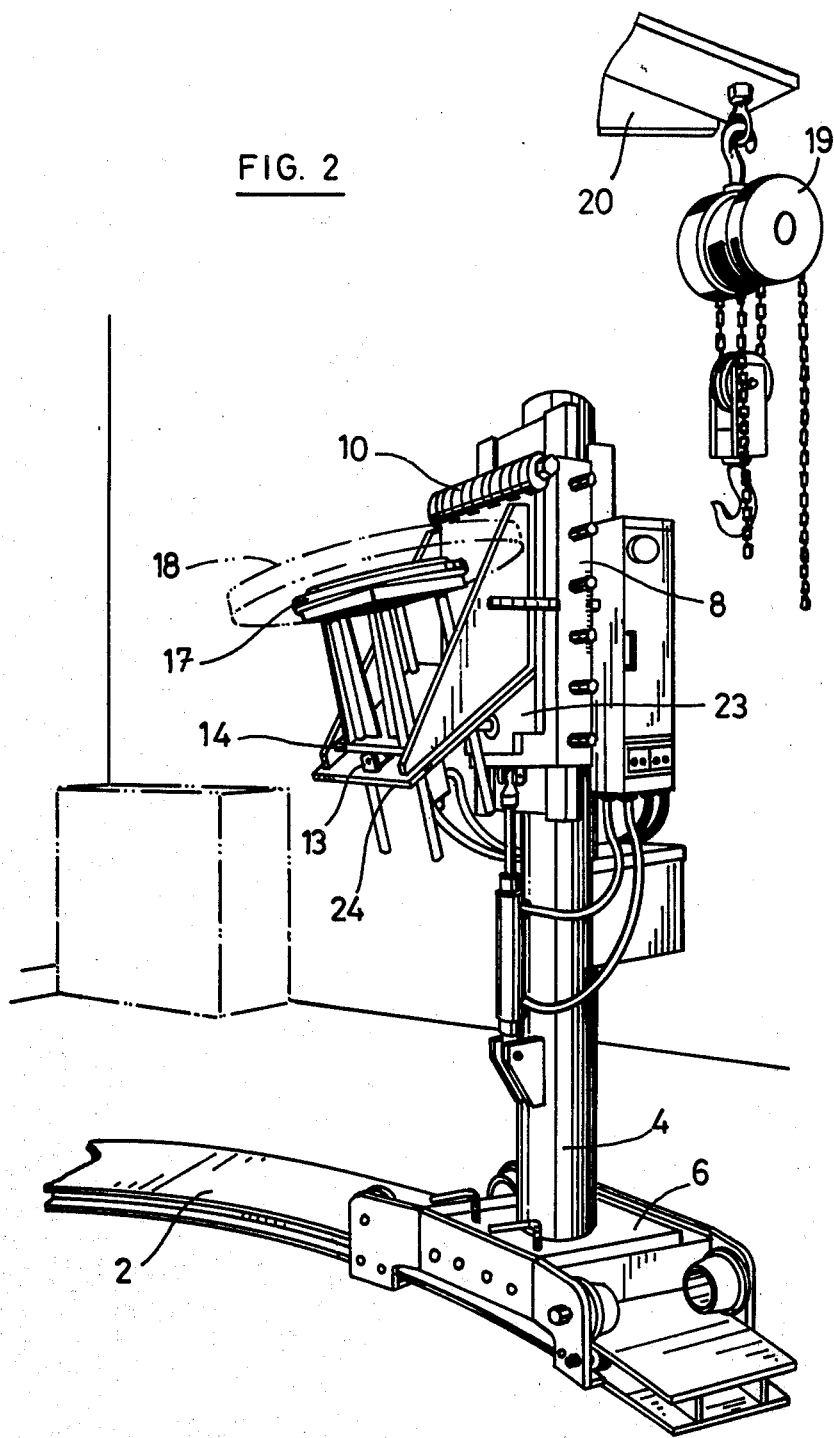

DEVICE FOR REMOVING AND/OR RE-INSTALLING MANHOLE LIDS ON AN APPARATUS UNDER PRESSURE

BACKGROUND OF THE INVENTION

The present invention relates to a for removing and-/or re-installing manhole lids in an apparatus under pressure.

Removing and re-installing manhole lids is particularly delicate owing to the radiation in the case of a nuclear apparatus such as a steam generator, and therefore the invention will be described for this typical application, it being understood that the invention is also applicable in each case when a mechanically similar problem arises.

In the particular case of a steam generator, the manhole is located in the lower part of the apparatus which is usually disposed vertically, i.e. in the lower hemispherical bottom. The lid is inclined at 40° relative to the vertical axis of the steam generator and located on legs projecting from the hemispherical bottom. Such lids must be secured so that the high pressure inside the apparatus may be kept. Removing and re-installing such lids require the lids to be positioned and the securing bolts to be tightened.

Equipment making such operations easier exists at present. The most widely known equipment is mainly of two types.

(a) Hinged system

When being removed the lid is made integral, through bolts, with a supporting angle-iron perpendicular to the axis thereof. This angle-iron may be rotated about an axis perpendicular to its length and relative to a rotating point situated above the legs. Through a fastening lug welded on the hemispherical bottom supporting this axis, the latter may function as a hinge for pivoting the lid and clearing the opening. However, this technique is only valuable when the lid is fixedly screwed on the bottom.

(b) Hinged system with crank screws

When using studs with nuts, the angle-iron may be made integral with the lid only through guides and crank screws so that the lid may be shifted on the opening axis, while being released from the studs before pivoting about the above mentioned hinge, thereby allowing access to the manhole. As already described, the lid may be maintained on its legs either through screws or studs and nuts. According to the usual practice, these screws or nuts are tightened with torque wrenches by acting successively upon each screw or nut in several crosswise movements. The main drawbacks of such a system are as follows:

Several workmen are operating simultaneously on the same lid.
Important manual labour.
Substantial working time under the steam generator.
As a direct result, a substantial exposure to radiation.
Utilization of a supporting means at each manhole.

As every steam generator comprises several manholes, the supporting means must accordingly be provided in the same number as the manholes.

The presently used techniques for fastening lids on the legs of the hemispherical bottoms of steam generators are principally of two types:

(a) successive step by step systems,
(b) simultaneous tightening systems.

The purpose is either to locate screws the heads of which are fastening the lid and the threaded portions of which passing through the bores of the lid are screwed in the bulge of the legs, or to locate studs a portion of which is also screwed in the legs, but which are fastening the lid through the intermediary of a nut also screwed on said studs. In order to maintain the pressure, it is necessary not only to provide the contact between the lid, the seal and the bottom legs, but also to provide a residual stress in the bolt system.

As already mentioned above, according to the usual practice, the screws or nuts are tightened with a torque wrench or spanner by successively acting upon each screw or nut in several crosswise movements, thereby uniformly distributing the stresses. Unfortunately, when the screws or nuts are so tightened, it is not possible to accurately define the residual stress within the bolt system.

In order to avoid such drawback, special tools are available for tightening the studs, thereby precisely determining the residual stress without the bolt system.

The stud is tightened through a small annular piston under a hydraulic pressure and pulling the stud.

For that purpose, use is made of a stud having three threaded portions, namely a first portion integral with the bottom of the steam generator, a second portion integral with the fastening nut of the lid and a third portion integral with a nut through which:

(1) the stud can be stressed below its yield strength,
(2) the second nut can contact the lid when the stud is stretched,
(3) the stress can be relieved within the stud, the required residual stress being provided by the second nut.

In order to uniformly distribute the stresses and with a view to saving time during the screwing and unscrewing operations, machines for simultaneously tightening all the studs are available in the industry. Said machines comprise principally a ring with bores through which are passing the threaded heads of the studs and pistons bearing on the lid for tightening the studs after having located the third nut connecting the studs with the machine.

The systems of the first type do not require any special supporting tools and they may be manually handled, whereas the systems of the second type require a special supporting means owing to the space occupied and the weight thereof, namely from about 250 to 300 kg to which one should add the pump assembly for raising the hydraulic-pneumatic pressure and weighing about 50 kg.

Heretofore, special tools only intended to support a system for simultaneously tightening studs, are known. A first known system comprises a modular wheeled carriage provided with linked arms supporting the ring provided for the simultaneous tightening so that this assembly can:

(1) be disposed under the steam generator,
(2) locate the ring on the lid,
(3) screw and unscrew the nuts after tightening, all these operations and any other excepted, being performed by this assembly, it being understood that the lid itself should be always supported and located through a system such as described under (b) above.

In order to carry out the three foregoing operations, a smooth floor allowing the carriage to roll must be provided, which is not always the case.

Another system provides a mechanization of the operations described for the hinge and crank system, said system permitting to support both a ring for simultaneously tightening the studs and the lid itself. Of course, such a system is a substantial improvement, but it requires the location of an assembly such as above described under each lid of the steam generator, i.e. two complete devices for a single steam generator, which is uneconomic.

SUMMARY OF THE INVENTION

The object of this invention is to avoid the drawbacks inherent to all the above described systems.

The object of the invention is attained by an integral and rapid device comprising means arranged for permitting both to support the stud tightening machine and the lids and to accurately position a tightening machine relative to each manhole and the studs.

The advantages of the device in accordance with the invention are:
 (a) it avoids the problems relating to the space occupied and the long and tedious manual operations;
 (b) it limits the number of operators under the steam generator (one workman many be sufficient),
 (c) it substantially reduces the time devoted to the above described operations,
(thereby substantially reducing the exposure of the personnel to radiation when a nuclear installation such as a steam generator is concerned).

DESCRIPTION OF THE DRAWINGS

FIG. 2 is a perspective view of a variation of the embodiment of FIG. 1, comprising a single guiding means.

DESCRIPTION OF AN EXEMPLARY EMBODIMENT

Figure 1:
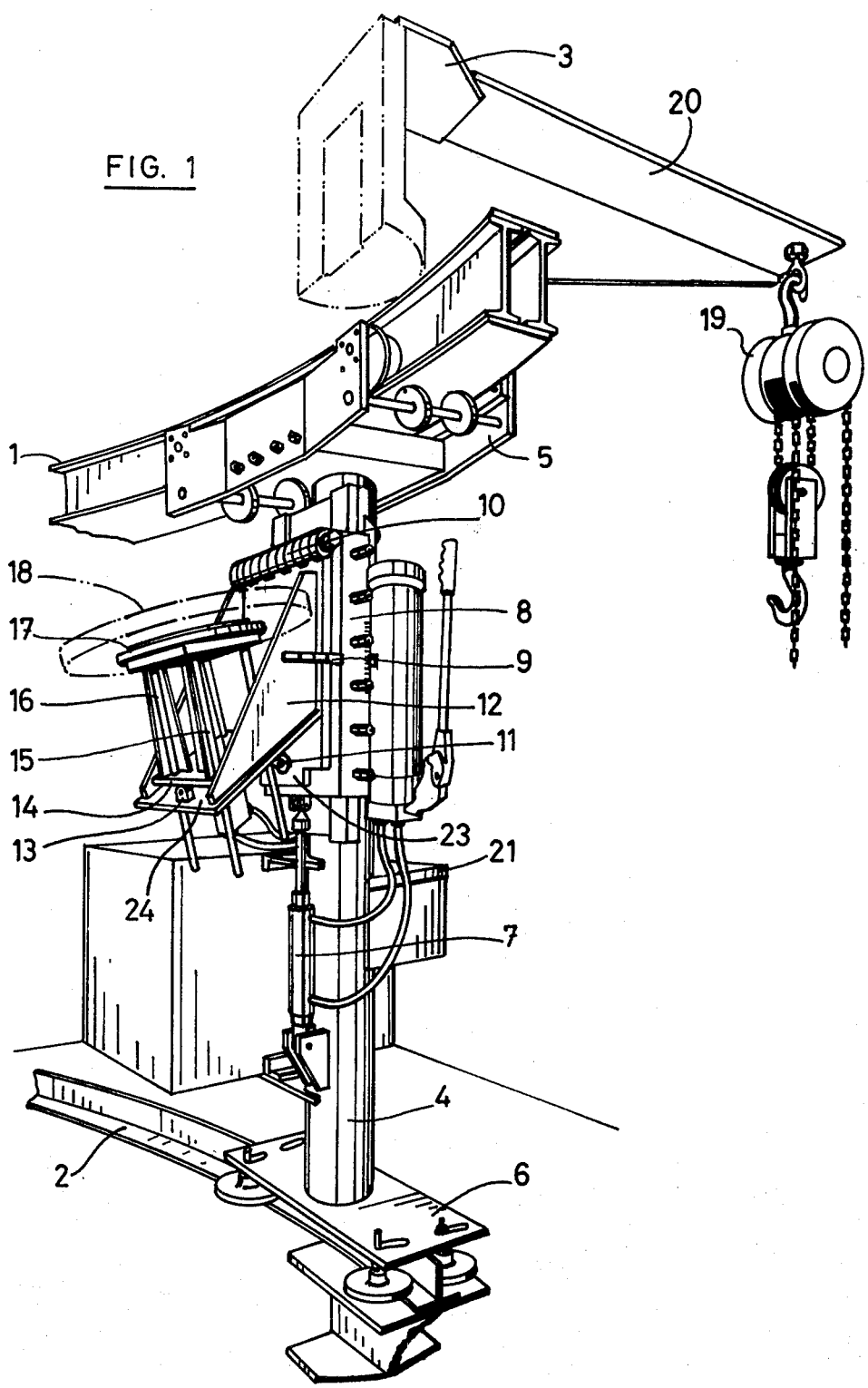
FIG. 1 is a perspective view of an exemplary embodiment according to the invention, comprising upper and lower guiding means.

The description will be subdivided into two parts:
(1) General supporting and rail location system,
(2) Supporting system for the tightening machine and the lid.

Referring to FIG. 1, the general supporting system comprises a vertical column 4 extending between two guide rails: namely an upper rail 1 and a lower rail 2. The rails may comprise straight and/or curved portions. The rails extend about at least a portion of the periphery of the bottom of the steam generator (not shown), thereby permitting the device to be located under one manhole or the other.

The upper rail 1 is made integral with the steam generator or the civil engineering system through fastening lugs 3 bolted to the supporting means and consisting of a rolling box. The lower rail 2 disposed either on the ground or the working floor essentially comprises a continuous T-iron bearing on elements integral with the floor when using two rails. However, according to the configurations of the civil engineering system and the supporting means, said rails could be inverted as an L-iron for the lower portion and as a T-iron for the upper portion. When using a single box-shaped rail, only the upper rail is inverted. The vertical column 4 is mounted on carriages 5 and 6 arranged for being movable along the rails 1 and 2. Since the carriages 5 and 6 are equipped with rollers taking up the vertical stresses upwards and downwards in a plane tangential to the rail, rollers moving on the web of the angle-irons are also provided in order to take up the stresses perpendicular to the rails and created by the torque resulting from the weight of the rings and lids in cantilever relative to the vertical column in the case of double rails. One of the carriages bearing on the rolling races (upper or lower according to the case) is provided with rollers capable of taking up the clearance resulting from the displacement of the steam generator.

The vertical column 4 comprises a shaft connecting the upper and lower carriages and a tube extending lengthwise about the shaft through friction bearings or bushings, thereby to permit the tube to pivot about the shaft. The supporting assembly for the stud tightening machine and the lid as well as all the pumps and jacks may be secured on said tube.

Owing to the pivotal movement of the tube about the shaft, the supporting means for the tightening machine and the lid is capable of
 (a) laying down the first lid on a rest-stand behind the working area before the translational movement towards the second manhole, and
 (b) preventing the abutment on the supporting props during said translative movement.

On the external tube of the vertical column 4 there is mounted rack means 8 for slidable movement along said tube. The tube and the rack means are interlocked through a dovetailed assembly having its axis parallel with the tube. the lower portion is connected with a hydraulic jack 7, the shifting axis of which is also parallel with the tube. The cylinder portion in said jack 7 is secured on the tube. By operating a pump integral with the column, the rack system can be raised and lowered relative to the tube. In order to save time during handling, a graduated scale 9 allows to locate each position of the assembly when handling the lid.

The slidable rack means 8 supports the support means for the stud tightening machine and the lid.

In order to allow an accurate positioning for laying down the tightening machine against the lid and for removing the lid from the studs, a fine adjustment along two directions is necessary. This is obtained with a two-hinge assembly. A first hinge 10 connects the slidable rack 8 with a plate 23 for permitting the tightening machine to be placed exactly at the inclination angle of the manhole axis. The clearances and the differences in inclination of the manhole axis relative to the rolling races are taken up through a knurled screw 11 by means of a scale. A supporting plate 24 inclined, e.g. at 40°, is secured on the second plate 23 and stiffened with brackets 12. The second hinge 13 is provided on plate 23. Another plate 14 is connected to the hinge 13 and supports a slidably mounted assembly for threading the tightening machine on the studs. The plate 14 hinged with plate 23 permits the machine to be positioned in exact alignment with the stud axes. A central jack 15 the pump of which is secured on the column 4 controls this sliding movement and four guides 16 provide the displacement thereof without any clearance and with a rigidity sufficient for supporting its weight and the weight of the lid. A heavy supporting table 17 connecting the four guides and pushed by the jack serves as a support for the stud tightening machine 18.

After having been positioned by means of shoulders, the tightening machine is interlocked with the supporting means through four bolts passing through oblong holes in the supporting table 17. Owing to the clearance resulting from the oblong holes, the location differences of the axes of the studs relative to each other may be taken up.

As the machine can be used for opening two manhole lids, it is necessary to remove the first lid when the working steps require the opening of a second manhole before closure of the first one. For that purpose, various tools have been provided, namely a supporting cradle for the lid and tools for grasping the lid on the machine and also a handling tackle 19. In order to improve the handling capabilities, a bracket 20 supports said tackle and is interlocked either with the rail or with the building structure.

Both equipments may be replaced by a single equipment comprising a double pivoting cradle. The first cradle, which is a vertical frame, is hinged on the building structure, while the second cradle, which is inside relative to the first cradle and which pivots about a horizontal axis, allows a direct grasping of the lid. This system avoids the location of the tackle.

In addition, all the manual operations carried out on the tightening machine and the studs have been simplified in the system through the use of pneumatic screwing devices with fitting tools, thereby limiting to the greatest possible extent the stresses and the time required for the manual operations. Furthermore, a box 21 containing all these tools is welded on the column in order to prevent any loss of materials.

FIG. 2 shows a variation of the embodiment described in the foregoing. In the embodiment of FIG. 2 the guiding means for the supporting structure comprises one rail 2 only. The vertical column 4 is here supported by the lower carriage 6. All the other arrangements are quite similar to those shown in FIG. 1.

What is claimed is:

1. A device for removing and re-installing manhole lids in an apparatus under pressure, comprising:
   guide means extending about at least a portion of the periphery of said apparatus;
   carriage means movable along the guide means;
   vertical column means mounted on said carriage means for rotation about a vertical axis with respect to said carriage means;
   rack means vertically slidably mounted on said column means;
   support means hingedly mounted on said rack means for pivoting relative to said rack means in a plane containing the rotation axis of the column means, said support means comprising a first supporting plate extending in a plane inclined at an acute angle to the rotation axis of said column means;
   supporting table means slidably mounted on said first supporting plate for translation movement in a direction inclined at an angle to the axis of said column means;
   first driving means for moving the rack means along said column means;
   second driving means for pivoting the column means about said axis;
   third driving means for pivoting said support means relative to the rack means in said plane; and
   fourth driving means for displacing said supporting table means with respect to said first supporting plate.

2. A device according to claim 1, wherein said supporting table means is mounted on a second supporting plate hingedly secured on said first supporting plate so as to be capable of pivotal movement relative to said first supporting plate about an axis that intersects the first-mentioned axis.

* * * * *